E. SCHRÖDER.
METHOD OF WELDING FLEXIBLE METAL HOSE.
APPLICATION FILED JAN. 13, 1917.

1,372,835.

Patented Mar. 29, 1921.

Witnesses:

Inventor:
Edmund Schröder

UNITED STATES PATENT OFFICE.

EDMUND SCHRÖDER, OF BERLIN, GERMANY, ASSIGNOR, BY MESNE ASSIGNMENTS, TO THE CHEMICAL FOUNDATION, INC., A CORPORATION OF DELAWARE.

METHOD OF WELDING FLEXIBLE METAL HOSE.

1,372,835.     Specification of Letters Patent.     Patented Mar. 29, 1921.

Application filed January 13, 1917. Serial No. 142,238.

*To all whom it may concern:*

Be it known that I, EDMUND SCHRÖDER, a subject of the German Emperor, and resident of Berlin, in the German Empire, have invented a new and Improved Method of Welding Flexible Metal Hose, of which the following is a specification.

The object of the present invention is the electric welding of flexible metal hose of any diameter, formed by a spirally wound metal band having an appropriate profile, and I attain this object by bringing both electrodes in contact with the outer surface of the metal hose, the arrangement being such that it is possible to attain, for the contact surface of one of the electrodes, a small specific current density.

My invention is illustrated in the accompanying drawing, in which.

Figure 1:
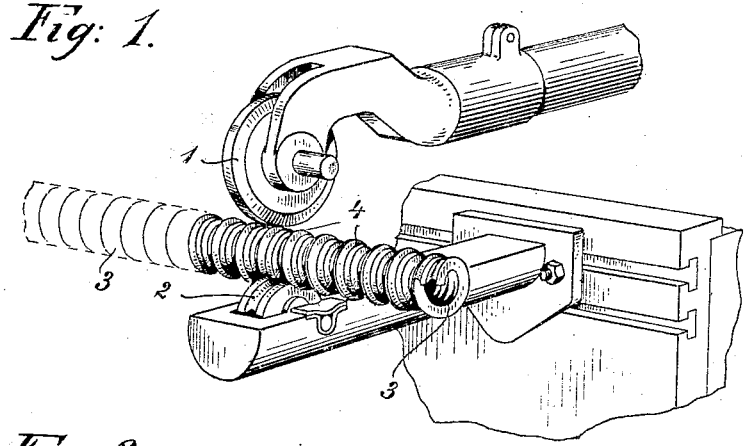
Figure 1 is a perspective representation of the two electrodes, together with a part of the metal hose.
Figure 2:
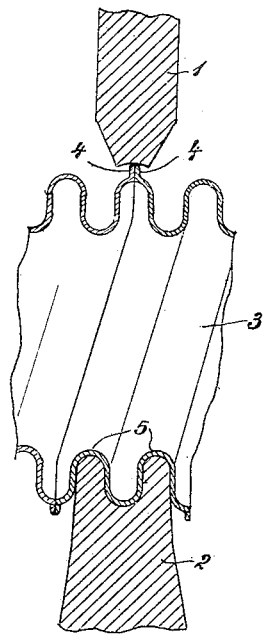
Fig. 2 is a longitudinal section through that part of the hose lying between the electrodes, together with the adjacent parts of the electrodes themselves, all these parts being drawn on a larger scale.
Figure 3:
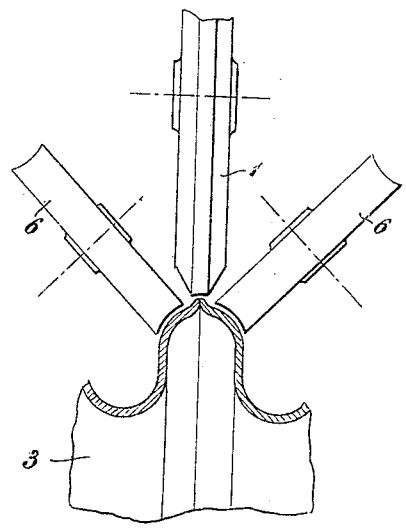
Fig. 3 is a view similar to Fig. 2, showing a somewhat modified form of the arrangement.

Referring to Figs. 1 and 2, 3 represents the hose which is supported by a worm 2 forming at the same time the lower electrode or pole. The other or upper electrode or pole is formed by a roll 1. Driving, *i. e.* rotating, means are provided either for the hose or for one or the other or both of the electrodes. In other words: the hose is rotated either directly or by means of an electrode or the electrodes. The electric current is supplied, upon large surfaces, through the electrode 2; there may be two electrodes 2 instead of one, or the one worm may have two spiral threads. The current concentrates at the points of contact 4 of the electrode 1 at which points heat is produced and the joint welded with the aid of pressure exerted upon it by the electrode.

The current may be supplied in another manner. For instance, while in the form of construction of the apparatus as just described both electrodes are solid, one of them, especially the lower one, may consist of a liquid conductive material, especially mercury, with which the hose is in contact, the welding being, in this case, effected at the upper electrode through the influence of heat and the pressure.

Another form of operation is the arrangement shown in Fig. 3, in which two rollers 6, 6 forming one of the poles are situated at the two sides of the joint which is welded by the other electrode 1. The electrode 1' is practically the same part as the electrode 1 in Figs. 1 and 2, whereas the rollers 6 form a substitute for the worm 2 of said figures.

If hose of a rather large diameter is to be manufactured from rather thick sheet metal, the two rolls 6, 6 may be so employed that one of them forms the one pole, the other the other pole, the roll 1 being then employed merely as the means for exerting the pressure upon the joint and this latter being prevented from outwardly yielding. Where three-phase current is made use of, the effect of the roll 1 may be increased by employing this roll as the third pole in the secondary circuit.

The one or the other or all contact parts may be sliding contacts, if desired or preferred.

What I claim is

1. The method of welding flexible metal hose formed of a spirally wound metal band having an appropriate profile and a flanged rim, consisting in allowing one of the electrodes contact with the hose metal throughout a large surface and the other exert a welding pressure upon the joint.

2. The method of welding flexible metal hose formed of a spirally wound metal band having an appropriate profile and a flanged rim, consisting in allowing two outer electrodes contact with the hose metal at the two sides of the joint upon a large surface, and exerting the welding pressure between said electrodes upon the joint proper.

3. The method of welding flexible metal hose formed of a spirally wound metal band having an appropriate profile and a flanged rim, consisting in allowing two of the three outer electrodes to contact with the hose metal at the two sides of the joint upon a large surface, and the third exert the welding pressure between said other two upon the joint proper.

4. The method of welding flexible metal hose formed of a spirally wound metal band having an appropriate profile and a flanged rim, consisting in allowing two of the three outer electrodes to contact with the hose metal at the two sides of the joint upon a large surface, and the third exert the welding pressure between said other two upon the joint proper, said third electrode forming the third pole in the secondary circuit of a three-phase current plant.

In witness whereof I have hereunto signed my name this twenty-fifth day of October, 1916, in the presence of two subscribing witnesses.

EDMUND SCHRÖDER.

Witnesses:
HENRY HASPER,
ALLEN F. JENNINGS.